United States Patent
Seki

(10) Patent No.: US 7,322,591 B2
(45) Date of Patent: Jan. 29, 2008

(54) SUSPENSION APPARATUS FOR A VEHICLE AND VEHICLE INCLUDING SAME

(75) Inventor: Bunzo Seki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 442 days.

(21) Appl. No.: 10/949,025

(22) Filed: Sep. 24, 2004

(65) Prior Publication Data

US 2005/0073126 A1   Apr. 7, 2005

(30) Foreign Application Priority Data

Sep. 30, 2003   (JP)   ............................. 2003-340118

(51) Int. Cl.
   *B60G 21/055*   (2006.01)
(52) U.S. Cl. .................. 280/124.152; 280/124.106; 280/124.137
(58) Field of Classification Search ......... 280/124.152, 280/124.166, 124.106, 124.137
   See application file for complete search history.

(56) References Cited

U.S. PATENT DOCUMENTS

| | | | | |
|---|---|---|---|---|
| 3,804,433 A * | 4/1974 | Scherenberg et al. . | 280/124.151 |
| 4,377,298 A * | 3/1983 | Finn et al. ............ | 280/124.142 |
| 4,583,759 A * | 4/1986 | Kami et al. ........... | 280/124.136 |
| 4,883,287 A * | 11/1989 | Murakami et al. .... | 280/124.135 |
| 5,125,843 A | 6/1992 | Holloway | |
| 5,238,261 A * | 8/1993 | Ogiso ................... | 280/124.138 |
| 5,332,255 A * | 7/1994 | Velazquez ............. | 280/86.754 |
| 5,496,055 A * | 3/1996 | Shibahata et al. .... | 280/124.141 |
| 5,630,609 A * | 5/1997 | Shin ..................... | 280/124.146 |
| 5,722,786 A * | 3/1998 | Kono et al. ........... | 403/228 |
| 6,079,722 A * | 6/2000 | Kato et al. ............ | 280/124.125 |
| 6,254,114 B1 * | 7/2001 | Pulling et al. ......... | 280/93.511 |
| 6,428,019 B1 * | 8/2002 | Kincad et al. .......... | 280/5.511 |
| 6,604,270 B2 * | 8/2003 | Kincaid et al. ............ | 29/441.1 |
| 6,637,757 B2 * | 10/2003 | Ignatius et al. .......... | 280/5.511 |
| 6,722,676 B2 * | 4/2004 | Zadok .................. | 280/124.106 |
| 6,752,408 B2 * | 6/2004 | La ....................... | 280/124.135 |
| 6,866,276 B2 * | 3/2005 | Carlstedt et al. ...... | 280/124.107 |

(Continued)

FOREIGN PATENT DOCUMENTS

DE            4226776 A1      2/1994

(Continued)

*Primary Examiner*—Eric Culbreth
*Assistant Examiner*—Karen J. Amores
(74) *Attorney, Agent, or Firm*—Carrier, Blackman & Associates, P.C.; William D. Blackman; Joseph P. Carrier

(57) ABSTRACT

In a vehicle suspension system, suspension arms are attached to the right and left sides of a vehicle body frame, a knuckle is attached to the ends of the suspension arms, a front shock absorber is provided between the vehicle body frame and the suspension arm on each side of the frame, and a stabilizer bar is provided extending between the right and left suspension arms. The stabilizer bar extends between rigid right and left shock support members provided on the ends of the suspension arms. The rigid shock support members are coupled to the knuckle, and also support the lower ends of the front shock absorbers. Costs of the suspension system are reduced by providing the rigid support member in combination with the stabilizer bar, since the shape of a suspension arm can be simplified without requiring particular increase in rigidity.

15 Claims, 8 Drawing Sheets

U.S. PATENT DOCUMENTS

| | | | |
|---|---|---|---|
| 2002/0074761 A1* | 6/2002 | Kincaid et al. | 280/124.152 |
| 2003/0111817 A1* | 6/2003 | Fader et al. | 280/124.166 |
| 2003/0164603 A1* | 9/2003 | Zadok | 280/124.106 |
| 2003/0184037 A1* | 10/2003 | Zadok | 280/124.106 |
| 2005/0006866 A1* | 1/2005 | Ziech et al. | 280/124.106 |
| 2005/0073126 A1* | 4/2005 | Seki | 280/124.152 |
| 2006/0082093 A1* | 4/2006 | Sterly et al. | 280/124.106 |
| 2006/0208448 A1* | 9/2006 | Dundon | 280/124.152 |

FOREIGN PATENT DOCUMENTS

| | | |
|---|---|---|
| EP | 1142617 A | 10/2001 |
| JP | 03213414 A | 9/1991 |
| WO | 9202916 A | 2/1992 |

* cited by examiner

SUSPENSION APPARATUS FOR A VEHICLE AND VEHICLE INCLUDING SAME

CROSS-REFERENCE TO RELATED APPLICATIONS

The present invention claims priority under 35 USC 119 based on Japanese patent application No. 2003-340118, filed Sep. 30, 2003.

BACKGROUND OF THE INVENTION

1. Field of the Invention

The present invention relates to vehicle suspension systems. More particularly, the present invention relates to the structure and installation of a stabilizer bar for a vehicle suspension system.

2. Description of the Background Art

A structure in which a stabilizer bar is provided in a wishbone-type suspension system between right and left upper suspension arms is known. For example, such a suspension system is described in Japanese Patent Laid-open No. Hei 3-213414.

FIG. 2 of Japanese Patent Laid-open No. Hei 3-213414 has been reproduced herein as FIG. 8. It will be described using newly assigned reference numerals. FIG. 8 is an explanatory diagram showing a conventional structure of a stabilizer bar within a suspension system of a vehicle. An upper suspension arm 202 and a lower suspension arm 203 are attached to a frame 201 so as to be pivotal in the vertical direction. A knuckle 204 is attached to the tips of the upper suspension arm 202 and the lower suspension arm 203, a wheel 206 is rotatably attached to the knuckle 204, and a stabilizer 208 is attached to the right and left upper suspension arms 202 and 202 (only one upper suspension arm 202 is shown) via joints 207 and 207 (only one of the joints 207 is shown).

A disadvantage of this conventional system becomes apparent when the vehicle body rolls. In this situation, a stroke difference occurs in the vertical direction between the right and left wheels 206, with the result that the stabilizer 208 is twisted since a vertical swing amount of the right upper suspension arm 202 and that of the left upper suspension arm 202 are different from each other. Consequently, a large load acts on the upper suspension arms 202. To support the load, the upper suspension arms 202 need high rigidity. In particular, a portion of the upper suspension arm 202 to which the joint 207 is attached has to have a large sectional area to increase rigidity, or has to be reinforced.

When an attachment part for attaching the stabilizer 208 is provided for the upper suspension arm 202, and an attachment part for attaching a rigid body 211, which is provided between the upper suspension arm 202 and the lower suspension arm 203, is provided for the upper suspension arm 202, the shape of the upper suspension arm 202 becomes complicated and the cost increases. Further, the shape of the upper suspension arm 202 is limited by these requirements so that the flexibility of designing deteriorates.

SUMMARY OF THE INVENTION

An object of the invention is to reduce the cost and to increase design flexibility of a suspension arm for a vehicle suspension system by simplifying the shape of the suspension arm without particularly requiring increase in rigidity of the suspension arm by including a stabilizer bar in a suspension system of a vehicle.

A first aspect of the invention is characterized in that in a vehicle suspension system in which suspension arms are attached to the right and left sides of a vehicle body frame, a knuckle is attached to the suspension arms, a shock absorber is provided between the vehicle body frame and a suspension arm, and a stabilizer bar for suppressing roll of the vehicle body is provided between the right and left suspension arms. More specifically, the stabilizer bar is provided between right and left shock support members, which are provided at the tips of the suspension arms. Left and right support members are also coupled to the knuckle, and support the ends of the shock absorber adjacent to the suspension arm side.

Left and right support members are provided having high rigidity to support a load acting on the shock absorber. By providing the stabilizer bar between the right and left shock support members, it becomes unnecessary to increase the rigidity of the suspension arm itself. Thus, the shape of the suspension arm is simplified, and flexibility of designing of the suspension arm is increased.

A second aspect of the invention is characterized in that when the suspension system includes an upper suspension arm and a lower suspension arm, the stabilizer bar is secured to the lower part of the shock support member that couples the upper suspension arm and the knuckle. The stabilizer bar is secured to the lower part of the shock support member and disposed between the upper suspension arm and the lower suspension arm.

A third aspect of the invention is characterized in that the stabilizer bar is secured to a stabilizer bar installation part provided on the suspension arm side, or inner side, of the support member when viewed from the front or rear of the vehicle. The stabilizer bar is installed in the stabilizer bar installation part by approaching the suspension system from the front or rear of the vehicle rather than the side of the vehicle. Such an approach allows installation of the stabilizer bar without interference from vehicle body frame, the suspension arms, and the like.

A fourth aspect of the invention is characterized in that the stabilizer bar includes: a torsion bar, arms integrally formed at both ends of the torsion bar to form a bar having a general U-shape, and links coupled to both ends of the U-shaped bar via ball joints. The U-shaped bar is pivotally attached to a front end or rear end of the vehicle body frame. The U-shaped bar and the links, as components of the stabilizer bar in a sub-assembled state, are easily attached to the front end part of the vehicle body frame from the front side of the vehicle body frame or to the rear end part of the vehicle body frame from the rear side of the vehicle body frame.

According to the first aspect of the invention, the stabilizer bar is provided between the right and left shock support members, an input load from the stabilizer bar can be received by the shock support members, which are provided with high rigidity for supporting the shock absorber. This has benefit since it is unnecessary to enlarge the sectional area of the suspension arm or to provide a reinforcing member for the suspension arm in order to increase the rigidity of the suspension arm, as is required for conventional suspension arms as discussed above in the Background section. Therefore, because it is unnecessary to enlarge the sectional area of the suspension arm or to provide a reinforcing member in order to increase its rigidity, the weight and cost can be suppressed.

Since the stabilizer bar is not attached in some midpoint of the suspension arm, the suspension arm can have a simple shape. Thus, the cost is reduced and flexibility of designing the suspension arm is increased.

According to the second aspect of the invention, when the suspension system includes an upper suspension arm and a lower suspension arm, the stabilizer bar is attached to the lower part of the shock support member that couples the upper suspension arm and the knuckle. Since the lower part of the shock support member is positioned in the space between the upper and lower suspension arms, the space is effectively used, and compactness is obtained.

According to the third aspect of the invention, the structure is employed such that the stabilizer bar is secured to a stabilizer bar installation part provided on the suspension arm side, or inner side, of the support member when viewed from the front or rear of the vehicle. Therefore, an installer can install the apparatus without interference with the vehicle body frame, suspension arms, and the like. Moreover, the installer can install the apparatus while easily viewing the apparatus from the front or rear side of the vehicle. Thus, assembly performance can be improved and the productivity can be increased.

According the fourth aspect of the invention, the stabilizer bar is constructed including a torsion bar, arms integrally formed at both ends of the torsion bar to form a bar having a general U-shape, and links coupled to both ends of the U-shaped bar via ball joints. The U-shaped bar is pivotally attached to a front end or rear end of the vehicle body frame. The stabilizer bar in a sub-assembled state can be easily attached to the front end part of the vehicle body frame from the front side of the vehicle body frame, or to the rear end part of the vehicle body frame from the rear side of the vehicle body frame. Thus, assembly performance can be improved and productivity can be increased.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF THE INVENTION

A selected illustrative embodiment of the invention will be described below, with reference to the attached drawings. The disclosure hereof includes the best mode contemplated by the inventors for carrying out the invention.

Vehicle Overview

Figure 1:
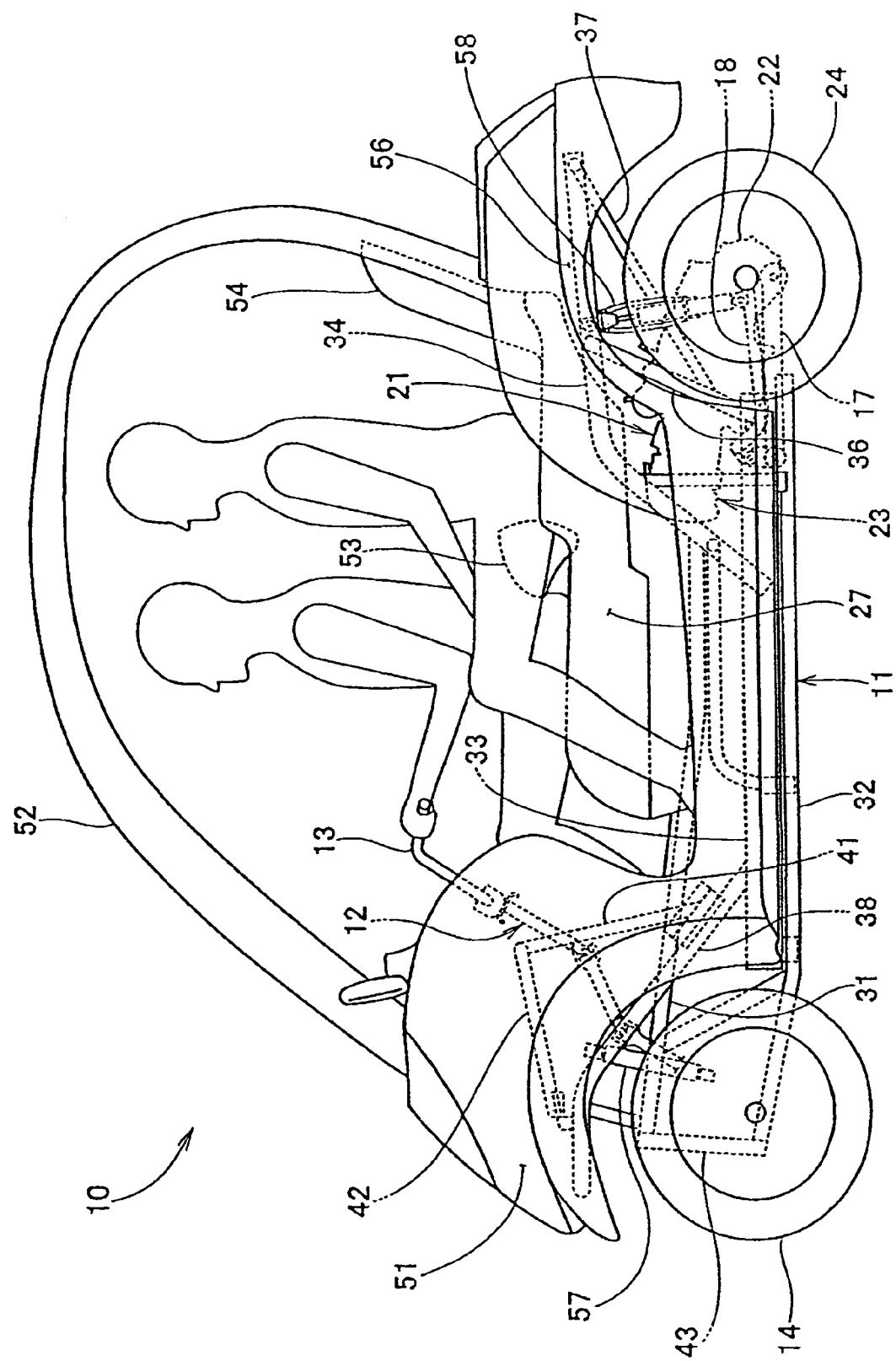
FIG. 1 is a side view of a vehicle on which the improved suspension system is mounted.

FIG. 1 is a side view of a vehicle 10 incorpoating a suspension system according to a selected illustrative embodiment of the invention. The vehicle 10 is a four-wheeled vehicle designed for carrying two persons, and includes a vehicle body frame 11. A steering shaft 12 is attached to a front portion of the vehicle body frame 11, and a handlebar 13 is attached to the top of the steering shaft 12 to permit steering of the right and left front wheels 14 and 15 of the vehicle (only the front wheel 14 on the left side is shown).

A powertrain unit 23, including an engine 21 and a transmission 22 attached to the rear portion of the engine 21, is attached to the rear portion of the vehicle body frame 11 via supporting arms 17 and 18. Rear wheels 24 and 26 (only the rear wheel 24 on the left side is shown) are attached to the output shaft of the powertrain unit 23, and a tandem seat 27 is attached to the top of the vehicle body frame 11.

Frame Structure

The vehicle body frame 11 includes right and left upper main frame sections 31 and 31 (only the main frame section 31 on the left side is shown) extended in the longitudinal direction of the vehicle. The vehicle body frame 11 also includes right and left lower main frame sections 32 and 32 (only the main frame section 32 on the left side is shown) disposed below the upper main frame sections 31 and 31 and extended in the longitudinal direction of the vehicle. The vehicle body frame 11 also includes right and left lower sub-frames 33 and 33 (only the lower sub-frame 33 on the left side is shown), attached to the top of the lower main frame sections 32 and 32 and extended in the longitudinal direction. The vehicle body frame 11 also includes right and left rear main frame sections 34 and 34 (only the rear main frame section 34 on the left side is shown), extending obliquely upwardly from an intermediate portion of the lower sub-frames 33 and 33, and then extending substantially horizontally towards the rear of the vehicle. The vehicle body frame 11 also includes first inclined rear frame sections 36 and 36 (only the first inclined rear frame section 36 is shown) extended from the lower sub-frames 33 and 33 to the rear main frame sections 34 and 34, and second inclined rear frame sections 37 and 37 (only the second inclined rear frame section 37 on the left side is shown) extending between the first inclined rear frame sections 36 and 36 and the rear ends of the rear main frame sections 34 and 34.

The vehicle body frame 11 further includes upraised front frame sections 38 and 38 (only the upraised front frame section 38 on the left side is shown) extending obliquely upwardly from the front portion of the lower sub-frames 33 and 33 towards the front. The vehicle body frame 11 further includes first inclined front frame sections 41 and 41 and second inclined front frame sections 42 and 42 attached to the upraised front frame sections 38 and 38 for supporting the steering shaft 12. The vehicle body frame 11 still further includes vertical front frame pipes 43 and 43 (only the vertical front frame pipe 43 on the left side is shown) extending between the respective front ends of the upper main frame sections 31 and 31 and the lower main frame sections 32 and 32.

Additional Vehicle Components

The vehicle 10 is provided with front fenders 51 and 51 (only the front fender 51 on the left side is shown), a roof 52, a lumbar support 53, a seat back 54, rear fenders 56 and 56 (only the rear fender 56 on the left side is shown), front shock absorbers 57 and 57 (only the front shock absorber 57 on the left side is shown), and rear shock absorbers 58 and 58 (only the rear shock absorber 58 on the left side is shown).

Suspension Structures

Figure 2:
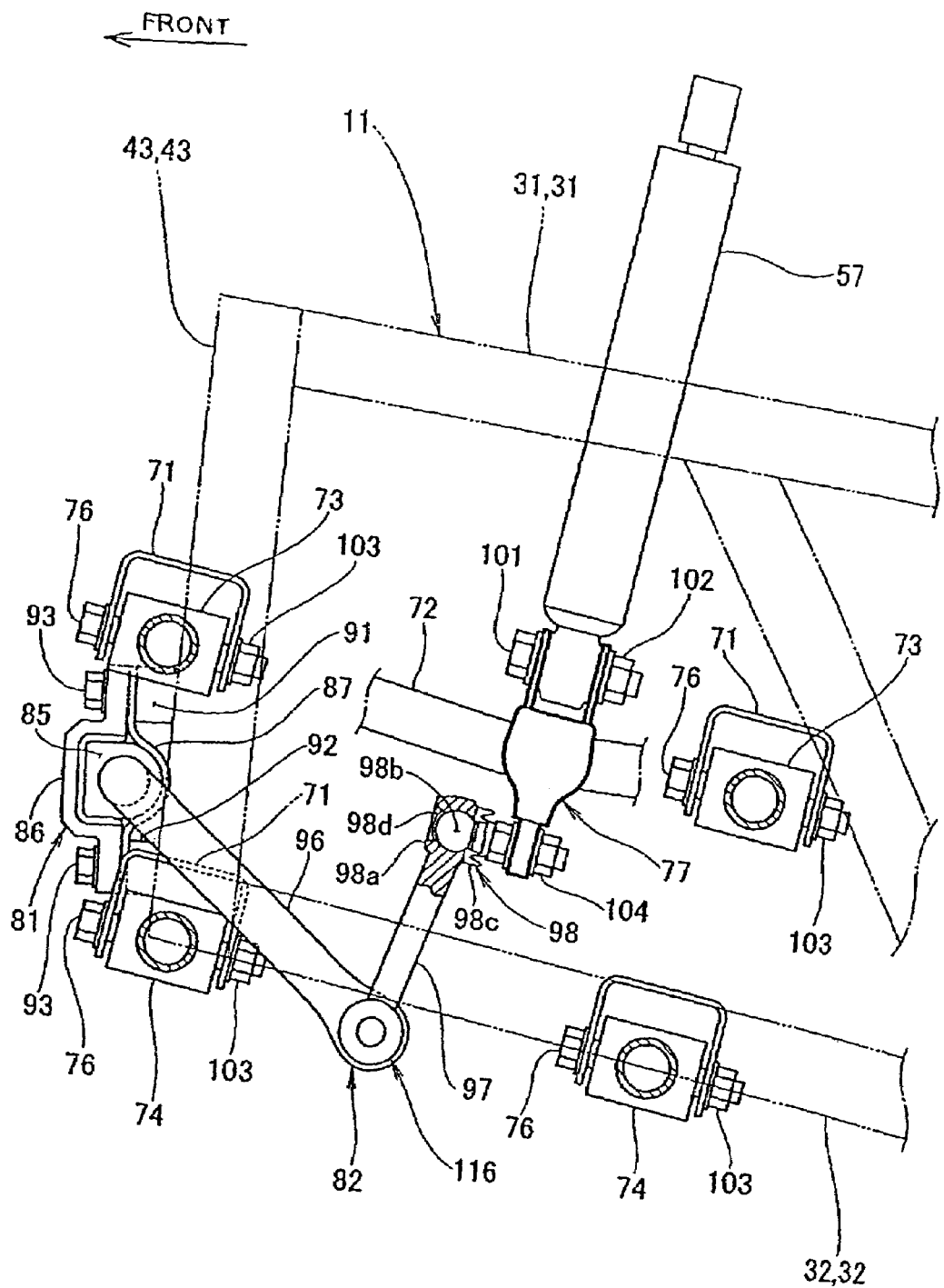
FIG. 2 is a side view of the front portion of the vehicle showing a side view of the stabilizer bar mounted between the vehicle frame and the support member, and showing the support member supporting the lower end of the shock absorber and one end of the upper suspension arm. The front direction of the vehicle is indicated by the arrow.

FIG. 2 is a side view of the front portion of the vehicle frame and suspension, and shows that a plurality of brackets 71 are attached to the vehicle body frame 11, for securing right and left suspension arms. The suspension arms, including attaching parts 73 and 73 for an upper suspension arm 72 and attaching parts 74 and 74 for a lower suspension arm 107 (not shown), are pivotally attached to the brackets 71 by bolts 76, serving as knuckles. A shock support 77 (drawn in the figures having a thick outline) is attached to the upper suspension arm 72. The lower end of the front shock absorber 57 is attached to the top of the shock support 77.

The body 96 of a stabilizer bar 82 is pivotally attached to the vertical front frame pipes 43 and 43 of the vehicle body frame 11 by installation fittings 81 and 81. Both terminal ends of the stabilizer bar 82 are attached to the lower parts of the shock support members 77 and 77 (only the shock support 77 on the left side is shown).

The installation fitting 81 allows pivotal attachment of the stabilizer bar 82 to the vertical front frame pipe 43. The installation fitting 81 includes a first metal bracket 86 whose center portion is bent in a U shape, a resilient bushing 85 that is fit about the stabilizer bar 82, and second metal bracket 87 whose center portion is curved in an arc shape. The resilient bushing 85 is sandwiched between the first and second metal brackets 86, 87, so as to be received within the space between the U-shaped opening of the first metal bracket and the arc shape of the second metal bracket 87. The installation fitting 81 is attached, by bolts 93 and 93, to projection bosses 91 and 92 on the vertical front frame pipes 43 and 43.

The vehicle stabilizing system hereof includes a stabilizer bar body 96 serving as a torsion bar for suppressing roll and/or sway of the vehicle body by increasing torsional rigidity. The torsion bar resists twist caused by a stroke difference between right and left wheels (in this case, the front wheels 14 and 15), that occurs when the vehicle body flexes. Use of a torsion bar reduces the stroke difference between right and left wheels. The vehicle stabilizing system also includes links 97 and 97 (only the link 97 on the left side is shown), linked to both ends of the stabilizer bar body 96, and ball joints 98 and 98 provided at ends of the links 97 and 97, and attached to the lower part of the shock support 77.

In the drawings, reference numbers 101 and 102 denote a bolt and a nut, respectively, for coupling the front shock absorber 57 to the shock support 77. Reference number 103 denotes a nut fit in the end of the knuckle 76, and reference number 104 indicates a nut for attaching the balljoint 98 to the shock support 77.

The ball joint 98 includes a socket 98a integrally formed within one tip, or distal end, of the link 97, a ball stud 98b integrally formed with a ball that is pivotally and rotatably fit in the socket 98a and coupled to the lower end of shock support 77. The ball joint 98 also includes dust covers 98c and 98d, for preventing dust from entering the fitted portion of the socket 98a and the ball stud 98b.

Figure 3:
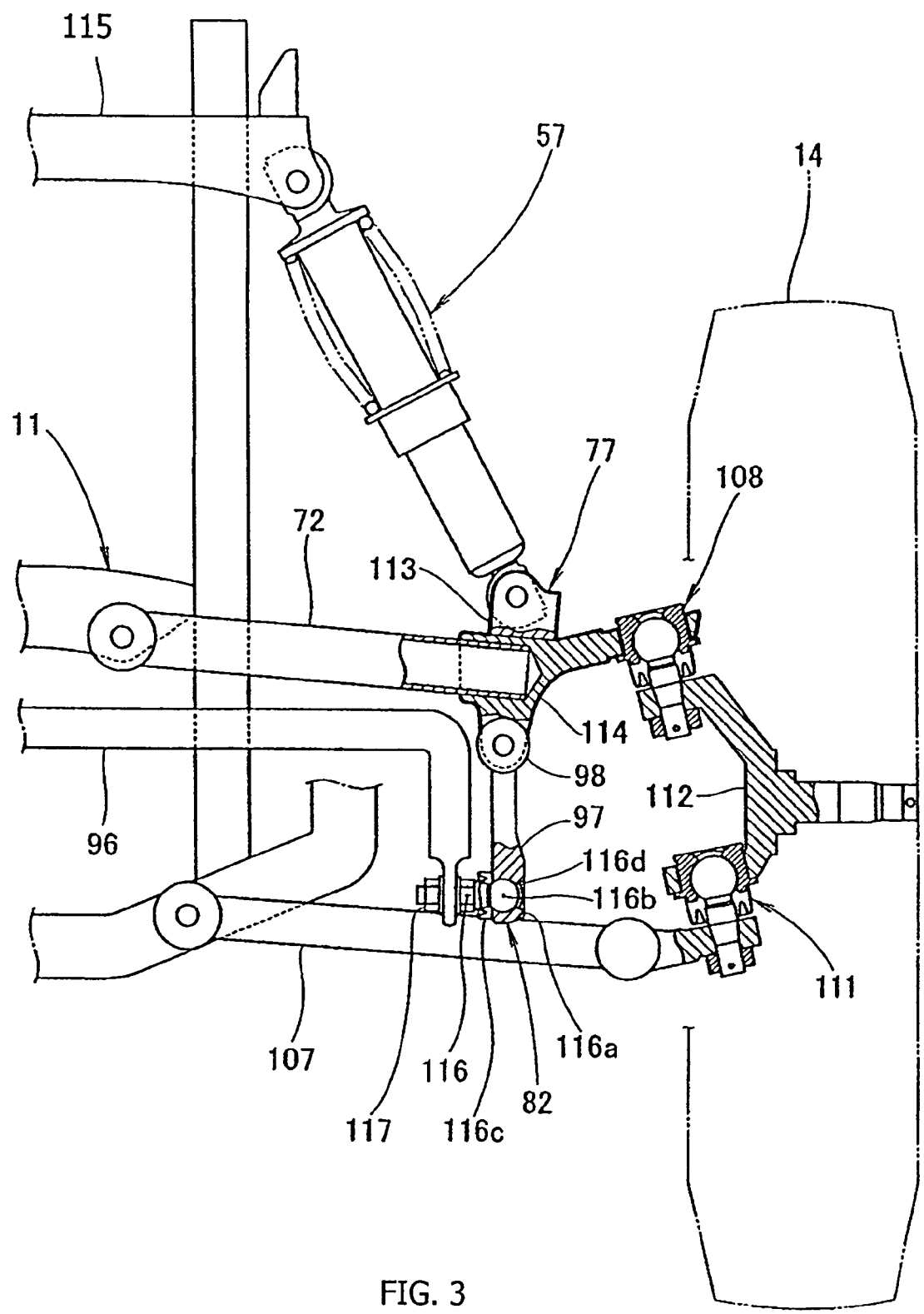
FIG. 3 is a front view in partial section of one side of the front of the vehicle showing the stabilizer bar mounted to a lower portion of the support member, and showing the support member joining the upper suspension arm and the knuckle.

FIG. 3 is a front detail view of part the body frame 11, also showing components of the suspension of the vehicle 10 according to the selected embodiment of the invention. The suspension includes the upper suspension arm 72 which is pivotally attached to the vehicle body frame 11 via the bracket 71, and the shock support 77 which is secured to the tip end of the upper suspension arm 72. The suspension also includes a lower suspension arm 107 that is pivotally attached to the vehicle body frame 11 via the bracket 71 and a knuckle 112. The upper and lower suspension arms 72, 107 are interconnected for synchronized parallel movement thereof, and are configured to be simultaneously and reciprocally pivotally movable in a substantially vertical direction.

Each of the front wheels 14 and 15 is rotatably attached to a respective knuckle 112. The knuckle 112 is pivotally attached to both an end of the shock support 77 and the lower suspension arm 107 via ball joints 108 and 111, respectively. The front shock absorber 57 is provided extending between a crossmember 115, provided for the vehicle body frame 11, and an upper installation part 113 integrally provided as part of the shock support 77. Each of the links 97 and 97, respectively, (only one of the links 97 is shown) of the stabilizing system hereof is coupled, at an upper end thereof, to a lower installation part 114 (only one of the lower installation parts 114 and 114 is shown). The lower installation parts 114, 114 are integrally provided on the lower part of the shock support members 77 and 77 (only one of the shock support members 77 and 77 is shown).

Ball joints 116 and 116 (only one of them is shown) couple the ends of the stabilizer bar body 96 of the stabilizer bar 82 and the links 97. A nut 117 attaches the ball joint 116 to the stabilizer bar body 96. The ball joint 116 is constructed having a socket 116a integrally formed at the lower end tip of the link 97, a ball stud 116b formed integrally with a ball which is pivotally and rotatably fit in the socket 116a and coupled to the stabilizer bar body 96, and dust covers 116c and 116d for preventing dust from entering the fitted portion of the socket 116a and the ball stud 116b.

Figure 4:
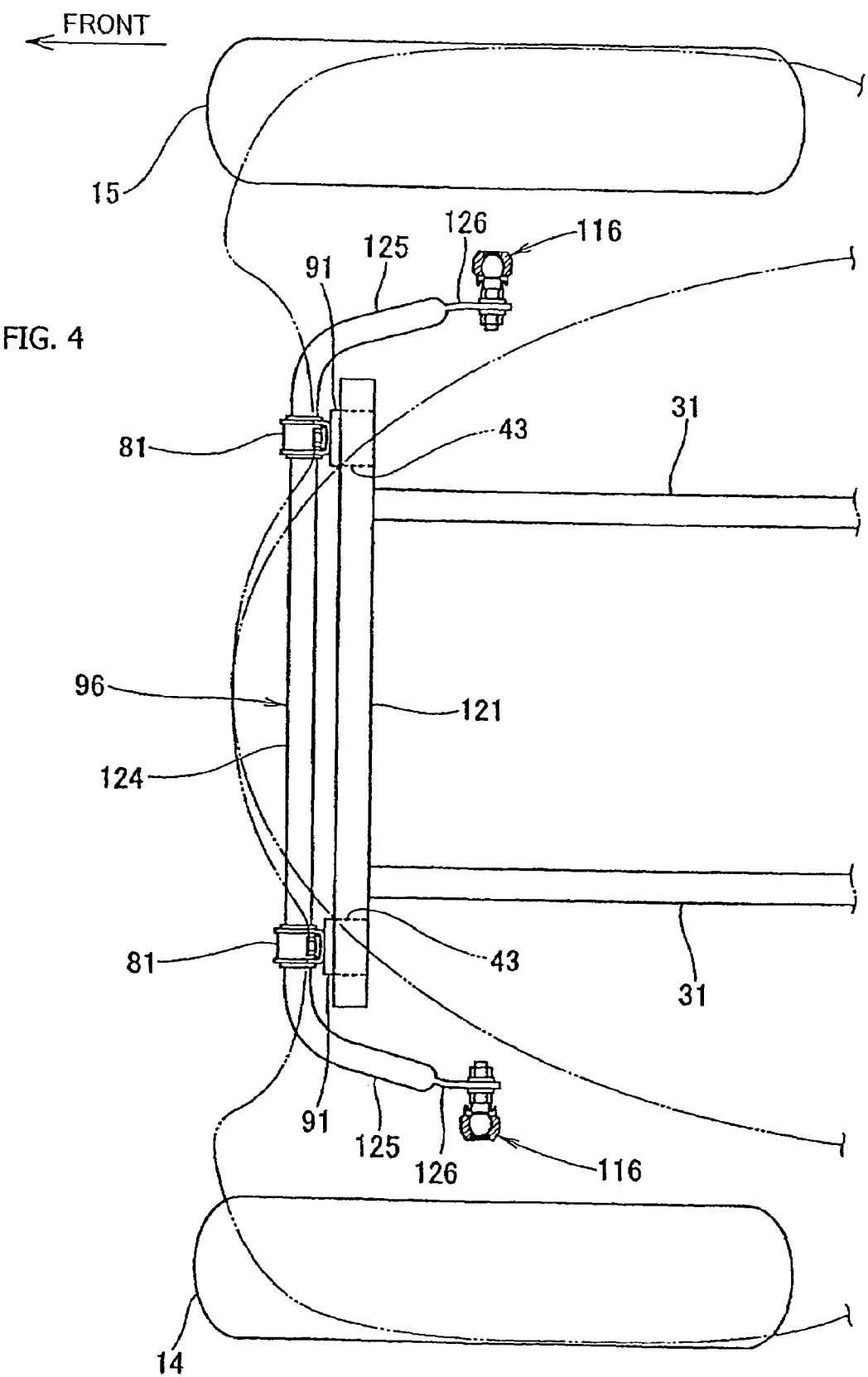
FIG. 4 is a plan view showing the front portion of the vehicle wherein the stabilizer bar is generally U-shaped and extends between the left front suspension and the right front suspension.

FIG. 4 is a top plan view, partially cut away, showing the front portion of the vehicle body frame 11 according to the illustrative embodiment of the invention. As shown in FIG. 4, a front upper frame connector 121, extended in the vehicle width direction, is attached to the front ends of the upper main frame sections 31 and 31. In addition, a front lower frame connector 122 (not shown) is attached at the front ends of the lower main frame sections 32 and 32 (refer to FIG. 1). The vertical frame front pipes 43 and 43 are provided so as to extend in the vertical direction between the front upper frame 121 and the front lower frame 122. The stabilizer bar body 96, formed almost in a U-shape, is pivotally attached to the projection bosses 91 and 92 (FIG. 2), provided on the vertical front pipes 43 and 43, by the installation fittings 81 and 81.

The stabilizer bar body 96 is constructed having a torsion bar part 124 that acts as a linear torsion bar, and arm parts 125 and 125 integrally formed at both ends of the torsion bar part 124. One end of each arm part 125 includes a plate-shaped part 126, for attachment to the ball joint 116.

Figure 5:
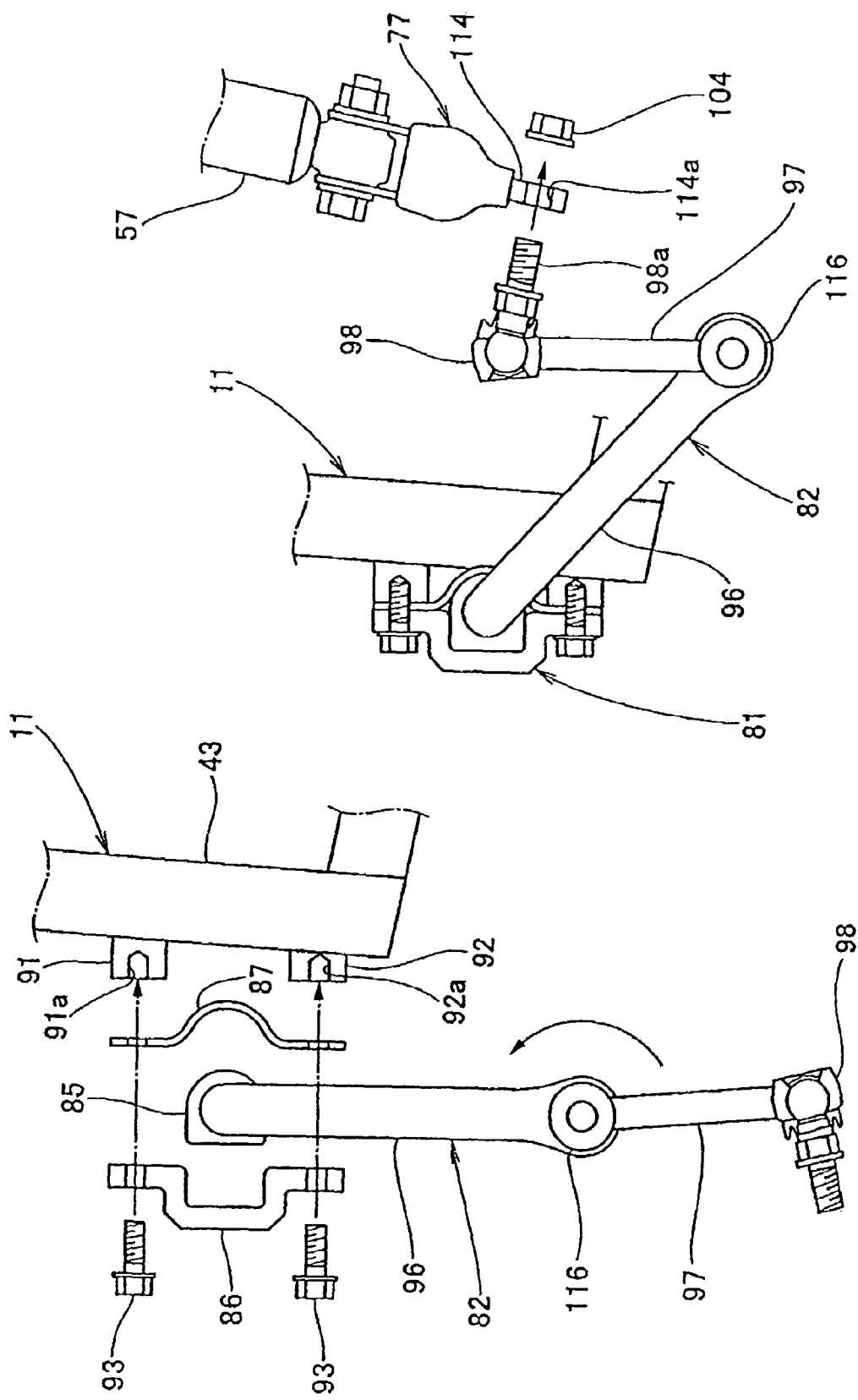
FIG. 5 is an assembly diagram showing a procedure for assembling a stabilizer bar upon the vehicle according to the invention.

A procedure for installing the above-described stabilizer bar 82 on a vehicle 10 will now be described with respect to FIGS. 5A and 5B. FIGS. 5A and 5B are assembly diagrams which illustrate this a procedure.

In FIG. 5A, the bushing 85 which supports the stabilizer bar body 96 is sandwiched between the first and second metal brackets 86 and 87. Bolts 93 and 93 are passed through the first and second metal brackets 86 and 87 and screwed into female threaded sockets 91a and 92a provided in the projection bosses 91 and 92, thereby installing the stabilizer bar 82 on the vertical front frame pipes 43 on the front end of the vehicle body frame 11.

Then the link 97 is swung upwardly, as shown by the arrow in FIG. 5A, to insert the male screw part 98a provided for the ball joint 98 into an installation hole 114a of the shock support 77, as shown by the arrow in FIG. 5B. Installation hole 114 is provided on the lower installation part 114 of the shock support 77. The nut 104 is then threadably attached to the male screw part 98a of the ball joint 98. In such a manner, installation of the stabilizer bar 82 on the vehicle body frame 11 and the shock support 77 at the front end of the vehicle is completed.

Figure 6:
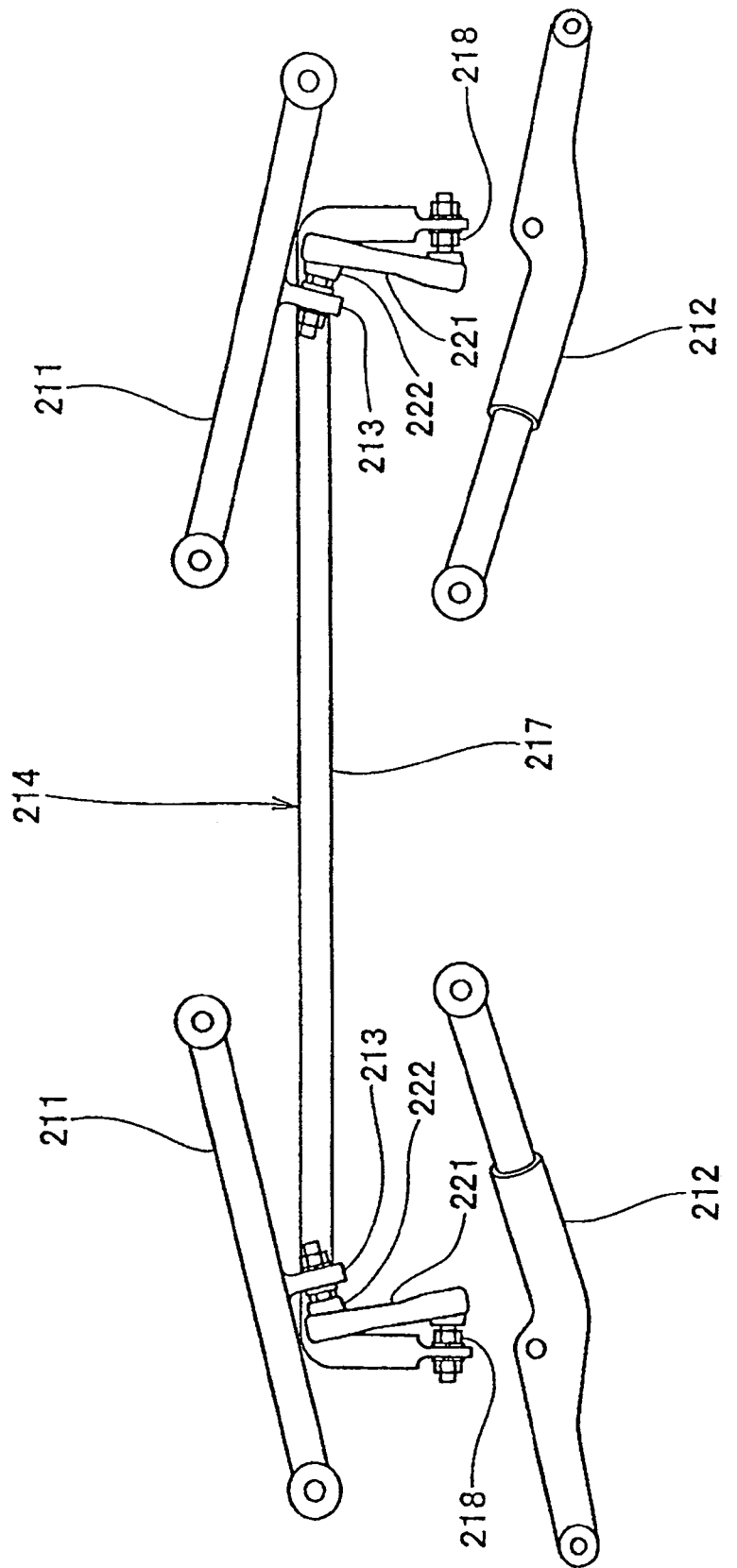
FIG. 6 is a front view showing an example of the prior art procedure for installing a conventional stabilizer bar.

FIGS. 6 and 7 are diagrams illustrating the installation for a conventional stabilizer apparatus, presented herein for comparative purposes. As shown in FIG. 6, right and left upper suspension arms 211 and 211 and right and left lower suspension arms 212 and 21 are attached to a vehicle body frame (not shown) so as to be pivotal in the vertical direction. A projection 213 is provided on an intermediate portion of each of the upper suspension arms 211 and 211, and a stabilizer bar 214 is installed between the projections 213. The stabilizer bar 214 includes a stabilizer bar body 217 having a U shape, links 221 and 221 coupled to both ends of the stabilizer bar body 217 via ball joints 218 and 218, and ball joints 222 and 222 for coupling the links 221 and 221 to the lower suspension arms 212 and 212.

Figure 7A:
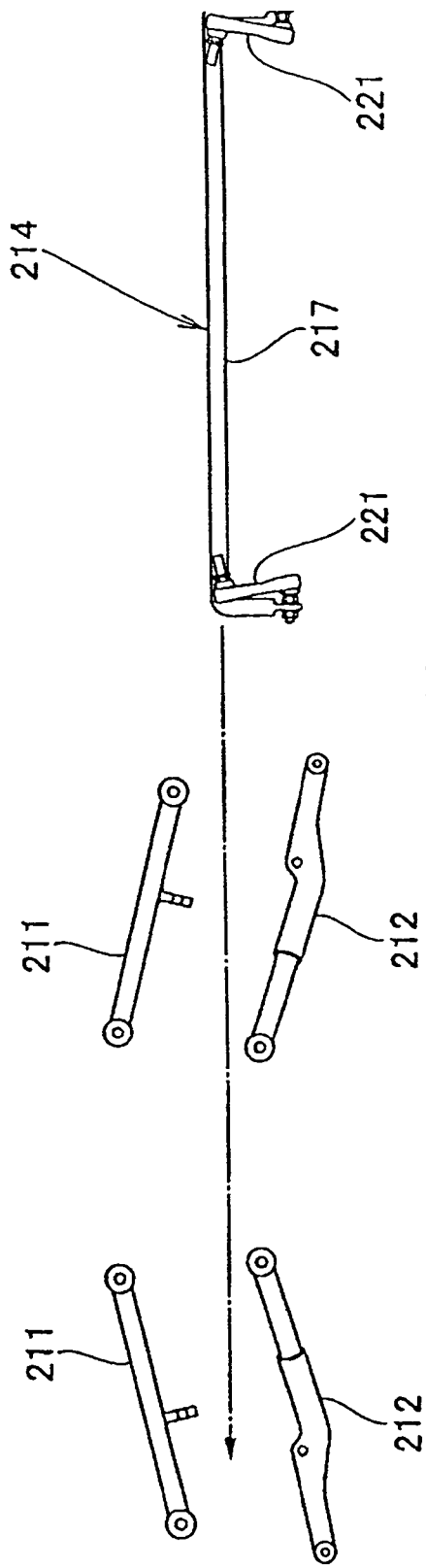
FIG. 7 is an assembly diagram showing a procedure for assembling the stabilizer bar illustrated in FIG. 6.
Figure 7B:
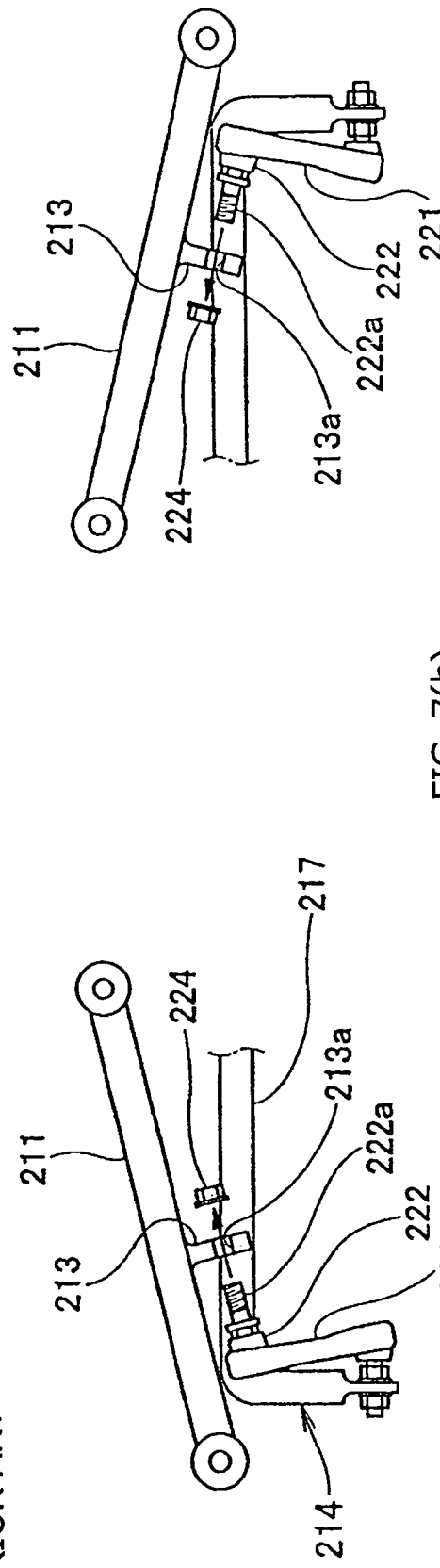
Figure 8:
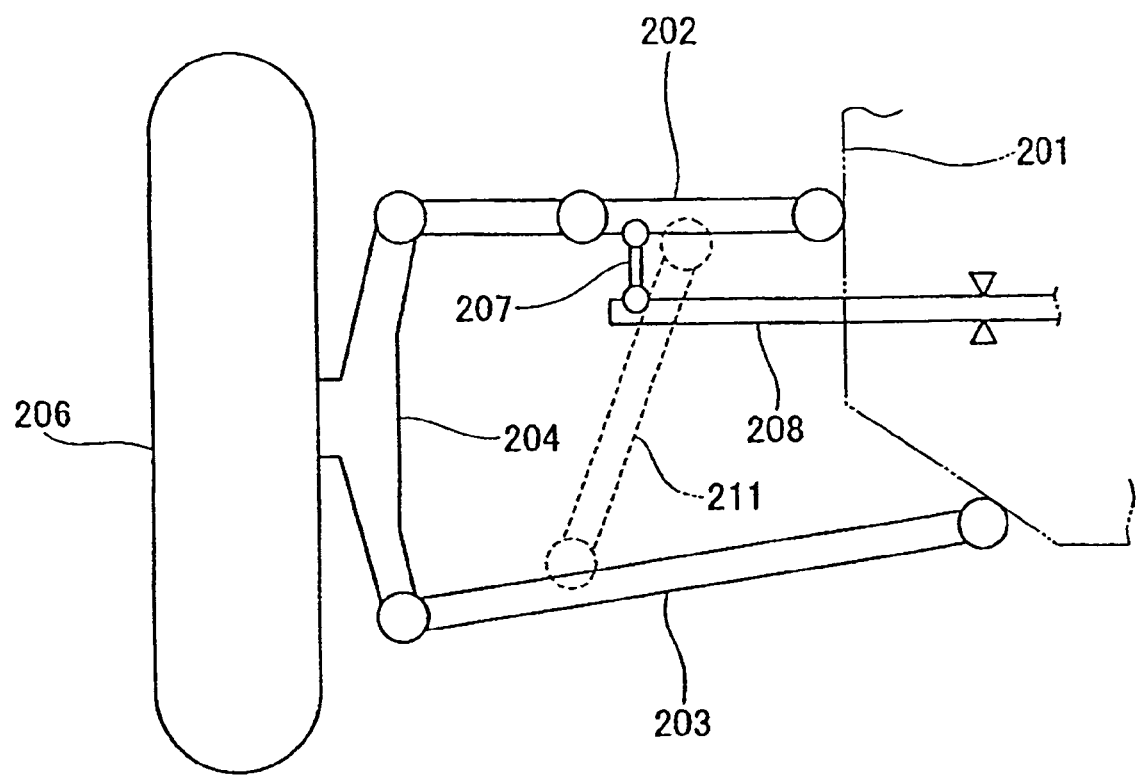
FIG. 8 is a reproduction of FIG. 2 of Japanese Patent Laid-open No. Hei 3-213414, and includes newly assigned reference numerals, and shows a prior art stabilizer bar within a suspension system of a vehicle.

FIGS. 7A and 7B are assembly diagrams showing a procedure of assembling the conventional stabilizer bar illustrated in FIG. 6.

In FIG. 7A, the stabilizer bar 214 is inserted between the right and left upper suspension arms 211 and 211 and the right and left lower suspension arms 212 and 212 as shown by the arrow. In FIG. 7B, the stabilizer bar body 217 is pivotally attached to a vehicle body frame (not shown). Male screw parts 222a and 222a provided on the ball joints 222 and 222 are inserted in installation holes 213a and 213a from generally the side of the vehicle. Installation holes 213a, 213a are provided on the projections 213 and 213 of the right and left upper suspension arms 211 and 211, and the male screw parts 222a and 222a are secured with nuts 224 and 224. Thus, installation of the conventional stabilizer bar 214 is accomplished.

As shown in FIGS. 7A and 7B, during installation of a conventional stabilizer bar, the stabilizer bar 214 has to be moved over a long distance between the right and left upper suspension arms 211 and 211 and the right and left lower suspension arms 212 and 212. This work has to be carefully done so that the stabilizer bar 214 does not interfere with the upper suspension arms 211 and the lower suspension arms 212 at the time of movement. Thus, assembly performance deteriorates.

As described above with reference to FIGS. 2 and 3, the present invention is characterized in that, in the vehicle 10 where the upper suspension arm 72 and the lower suspension arm 107 are attached to the right and left of the vehicle body frame 11, the knuckle 112 is attached to one end of the suspension arms 72 and 107, the front shock absorber 57 is provided between the vehicle body frame 11 side and the end of the suspension arm 72, and the stabilizer bar 82 for suppressing roll of the vehicle body is provided between the right and left suspension arms 72 and 72. More specifically, the stabilizer bar 82 is provided between right and left shock support members 77, 77, which are provided at the ends of the upper suspension arms 72, 72. Left and right support members 77, 77 are also coupled to the knuckle 112, and support the ends of the shock absorber 57 adjacent to the suspension arm side.

An input load from the stabilizer bar 82 can be received by the shock support 77. Shock support 77 is provided having high rigidity to accommodate supporting the front shock absorber 57. This is in contrast to the conventional construction where the rigidity of the installation parts, provided on the suspension arms for attaching the stabilizer bar in some midpoint of the suspension arms, has to be increased. In the present invention, it is unnecessary to increase the rigidity of the suspension arms. Therefore, it is unnecessary to enlarge the sectional area of the suspension arm or to provide a reinforcing member in order to increase the suspension arm rigidity, so that increase in weight and cost can be suppressed.

Since the stabilizer bar 82 is not attached to the mid portion of the suspension arms 72 and 107, the suspension arms 72 and 107 can have a simplified shape. Thus, the cost is reduced and flexibility of designing the suspension arms 72 and 107 is increased.

The invention is further characterized in that when the suspension system is constructed using the upper and lower suspension arms 72 and 107, the stabilizer bar 82 is attached to the lower part of the shock support 77 which couples the upper suspension arm 72 and the knuckle 112.

The lower part of the shock support 77 is positioned in the space between the upper and lower suspension arms 72 and 107, so that the space can be effectively used, and compactness can be obtained.

The invention is further characterized in that the stabilizer bar 82 is secured to a stabilizer bar installation part 114 provided on the suspension arm side, or inner side, of the support member 77 when viewed from the front or rear of the vehicle.

The knuckle 112, a hub, a disc brake, and wheels (front wheels 14 and 15) are attached to the tips, or ends, of the suspension upper and lower arms 72 and 107. In order to install the stabilizer bar to the suspension arm side from sides of the vehicle body, even when the wheels are detached, the knuckle, hub, and disc brake are in the way and interfere with the installation. Consequently, the worker has to install the stabilizer bar while viewing the apparatus from an obliquely rear or front of the side of the vehicle body. Thus, tools cannot be easily used and assembly performance is degraded.

In the present invention, however, the anti-roll apparatus 82 is attached to the lower installation part 114 of the shock support 77 from the front or rear side of the vehicle. Therefore, the worker can make perform the installation without interference with the vehicle body frame 11, suspension arms 72 and 107, and the like. Moreover, the worker can view the lower installation part 114 in front of the worker from the front or rear side of the vehicle. Thus, assembly performance is improved and the productivity is increased.

The invention is still further characterized in that the stabilizer bar 82 has the following construction: the stabilizer bar body 96 includes the torsion bar part 124, the arm parts 125 and 125 integrally formed at both ends of the torsion bar part 124; and the links 97 and 97 coupled to both ends of the stabilizer bar body 96 via the ball joints 116. The stabilizer bar body 96 is pivotally attached to the frame front pipes 43 and 43 at the front end portion of the vehicle body frame 11 (or, alternatively, is pivotally attached to the rear end portion of the vehicle body frame 11).

The stabilizer bar 82 in a sub-assembled state can be easily attached to the front end part of the vehicle body frame 11 from the front side of the vehicle body frame 11 or to the rear end part of the vehicle body frame 11 from the rear side of the vehicle body frame 11. Thus, assembly performance can be improved and productivity can be increased.

Although the shock support 77 is attached to the upper suspension arm 72 in the embodiment as shown in FIG. 3, the invention is not limited to this configuration. It is also possible to attach the shock support 77 to the lower suspension arm 107, couple the lower suspension arm 107 and the knuckle 112 via the shock support 77, and attach the lower end of the front shock absorber 57 and the stabilizer bar 82 to the shock support 77.

It is also possible to attach the shock support 77 to the front end of the suspension arm as a component of the rear suspension, attach the lower end of the rear shock absorber 58 (refer to FIG. 1) to the shock support 77, and install the ant-roll bar 82 across the right and left shock support members 77 and 77.

The inventive stabilizer bar 82 described herein is suitable for a three-wheel vehicle and a four-wheel vehicle.

Although the present invention has been described herein with respect to an illustrative embodiment, the foregoing description is intended to be illustrative, and not restrictive. Those skilled in the art will realize that many modifications of the embodiment could be made which would be operable. All such modifications which are within the scope of the claims are intended to be within the scope and spirit of the present invention.

I claim:

1. In a vehicle comprising a vehicle body frame, the improvement comprising a suspension stabilization system comprising:
    a stabilizer bar;
    left and right shock support members which are operatively connected to the vehicle body frame;
    left and right suspension arms, a first end of each of the suspension arms being operatively attached to the vehicle body frame, and a second end of each of the suspension arms being operatively attached to a respective shock support member;
    left and right knuckles, wherein a knuckle is operatively attached to the second end of each suspension arm such that it is coupled to a shock support member;
    left and right shock absorbers, wherein a shock absorber is provided extending between the vehicle body frame and the second end of each suspension arm, such that the shock absorber is supported by, and pivotally connected to an upper end of, the shock support member, and
    wherein the stabilizer bar is operatively connected to the left and right shock support members proximate the second ends of said suspension arms.

2. A suspension system according to claim 1, wherein each of said left and right suspension arms comprises an upper suspension arm and a lower suspension arm, wherein the shock support member is operatively connected to the upper suspension arm on each side of the vehicle, and wherein said stabilizer bar is operatively attached to a lower part of said shock support member.

3. A suspension system according to claim 1, wherein the stabilizer bar is secured to said shock support member by a link having two ball joints thereon.

4. A suspension system according to claim 1, wherein the stabilizer bar is adapted to be installed from the front of the vehicle.

5. A suspension system according to claim 1, wherein the stabilizer bar is comprises a torsion bar, arms integrally formed at both ends of the torsion bar that provide the stabilizer bar with a generally U-shape, and links coupled to both arms using ball joints, and wherein the U-shaped stabilizer bar is pivotably attached to a front end of a vehicle body frame.

6. A suspension system according to claim 1 wherein the shock support members are substantially rigid.

7. A suspension system according to claim 1 wherein the shock support member on each side of the vehicle is coupled to the corresponding knuckle using a first ball joint.

8. A suspension system according to claim 1 wherein the suspension system comprises link members, each link member comprising an upper end and a lower end, and wherein the support member is coupled to the stabilizer bar using a link member such that the upper end of the link member is coupled to the support member using a support ball joint, and such that the lower end of the link member is coupled to the stabilizer bar using a stabilizer ball joint.

9. A suspension system according to claim 8 wherein the support member comprises a mounting structure for the stabilizer ball joint, and wherein the mounting structure is oriented such that the stabilizer ball joint is secured to a front face of the support member when the stabilizer bar is mounted to a front suspension system, and to a rear face of the support member when the stabilizer bar is mounted to a rear suspension system.

10. A vehicle suspension system comprising right side suspension arm, left side suspension arm, a right side shock absorber, a left side shock absorber, a right side knuckle, and a left side knuckle, a right side rigid support member, a left side rigid support member, and a torsion bar wherein
    the right side rigid support member couples the right side suspension arm, the right side shock absorber, the right side knuckle, and the torsion bar at a right end thereof, and
    the left side rigid support member couples the left side suspension arm, the left side shock absorber, the left side knuckle, and the torsion bar at a left end thereof,
    such that the torsion bar extends between the right side suspension arm and the left side suspension arm, the shock absorbers are pivotally connected to an upper side of the respective rigid support members, the torsion bar is pivotably connected to a lower side of each respective support member, and the suspension arms are fixed to a mid portion of the respective rigid support member.

11. The vehicle suspension system of claim 10 wherein
    the right side suspension arm comprises a right upper suspension arm and a right lower suspension arm,
    the left side suspension arm comprises a left upper suspension arm, and a left lower suspension arm,
    the right upper suspension arm, the a right lower suspension arm, the left upper suspension arm, and the left lower suspension arm each comprise an inner end which is attached to the vehicle frame, and an outer end,
    the outer end of the right upper suspension arm is attached to the right side rigid support member,
    the outer end of the right lower suspension arm is attached to the right knuckle,
    the outer end of the left upper suspension arm is attached to the left side rigid support member, the outer end of the left lower suspension arm is attached to the left knuckle.

12. The vehicle suspension system of claim 11 wherein the suspension system comprises a right side link and a left side link, the right side link having an upper end and a lower end, the left side link having an upper end and a lower end, the right side link extending between the torsion bar and the right side rigid support member such that the upper end of the right side link is secured to the right side rigid support member using a first ball joint and the lower end of the right side link is secured to the right side rigid support member using a second ball joint, the left side link extending between the torsion bar and the left side rigid support member such that the upper end of the left side link is secured to the left side rigid support member using a third ball joint and the lower end of the left side link is secured to the left side rigid support member using a fourth ball joint.

13. A suspension system for a vehicle according to claim 12 wherein the right side rigid support member comprises a first mounting means for the first ball joint, and wherein the first mounting means is oriented such that the first ball joint is secured to a front face of the right side rigid support member when the torsion bar is mounted to a front suspension system, and to a rear face of the right side rigid support member when the torsion bar is mounted to a rear suspension system, and wherein the left side rigid support member comprises a second mounting means for the third ball joint, and wherein the second mounting means is oriented such that the third ball joint is secured to a front face of the left side rigid support member when the torsion bar is mounted to a front suspension system, and to a rear face of the left side rigid support member when the torsion bar is mounted to a rear suspension system.

14. A suspension system for a vehicle according to claim 13 wherein the torsion bar is comprises an elongate bar having a right end portion and a left end portion, wherein the right end portion and left end portion of the torsion bar are separated by a body portion, the right end portion and the left end portion of the torsion bar extend in a direction that is normal to the body portion such that the torsion bar has a general U-shape, the right end portion and the left end portion of the torsion bar are each provided with a flattened region, the flattened region of the right end portion being attached to the second ball joint, the flattened region of the left end portion being attached to the fourth ball joint.

15. A suspension system for a vehicle comprising a stabilizer bar, suspension arms, and shock absorbers, a suspension arm is attached to each of the left side and the right side of the vehicle body frame, a shock absorber is provided on each of the left side and the right side between the vehicle body frame and the suspension arm, the stabilizer bar extends between the suspension arm on the left side and the suspension arm on the right side, and a rigid support member secures the stabilizer bar to the suspension arm such that the suspension arm is rigidly fixed to the rigid support member, and the stabilizer bar is connected to the rigid support mechanism through a pivotable link mechanism.

* * * * *